United States Patent [19]

Komura et al.

[11] Patent Number: 4,957,278
[45] Date of Patent: Sep. 18, 1990

[54] COIL SPRING

[75] Inventors: Syoichi Komura; Hiroyuki Toyofuku, both of Kyoto, Japan

[73] Assignee: Sanko Senzai Kogyo Kabushiki Kaisha, Kyoto, Japan

[21] Appl. No.: 336,476

[22] Filed: Apr. 12, 1989

[30] Foreign Application Priority Data

Jan. 10, 1989 [JP] Japan .................. 1-4095

[51] Int. Cl.$^5$ ............................. F16F 1/10
[52] U.S. Cl. ............................ 267/166; 267/180
[58] Field of Search ............... 267/166, 180, 155, 156, 267/167, 182

[56] References Cited

U.S. PATENT DOCUMENTS 4,735,403  4/1988  Matsumoto et al. ............... 267/180

FOREIGN PATENT DOCUMENTS 0241535  11/1985  Japan ................... 267/180
0251537  11/1987  Japan ................... 267/180

Primary Examiner—Duane A. Reger
Attorney, Agent, or Firm—Armstrong, Nikaido, Marmelstein, Kubovcik & Murray

[57] ABSTRACT

A coil spring has a strand having a width w and a thickness t, such that $1.1 \leq c \leq 1.7$, where c is a ratio determined according to $c = w/t$. Further, the strand has a cross-sectional shape defined by a plurality of partial curves, which are portions of a clothoid, a curve whose radius varies inversely in proportion to its length. Further, the partial curves are combined to form a closed loop. The tangent lines of any adjacent two of the partial curves of the coil spring, at their boundaries where they are combined, are oriented in the same direction.

2 Claims, 5 Drawing Sheets

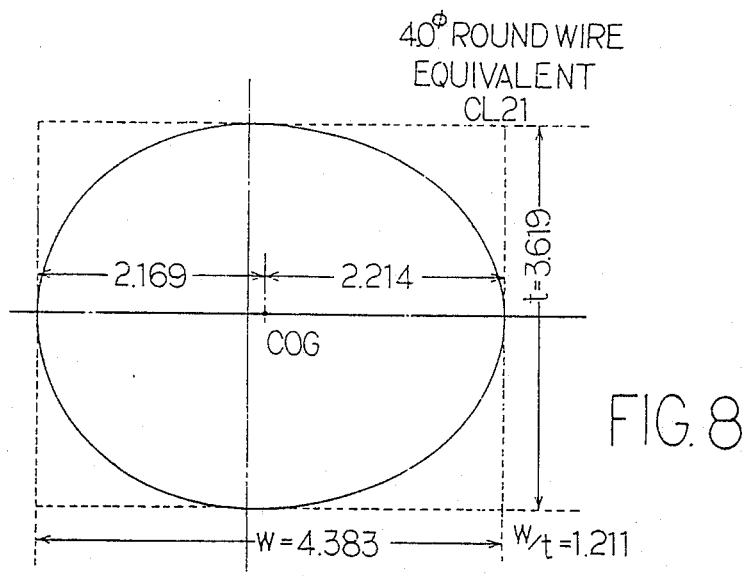
FIG. 8
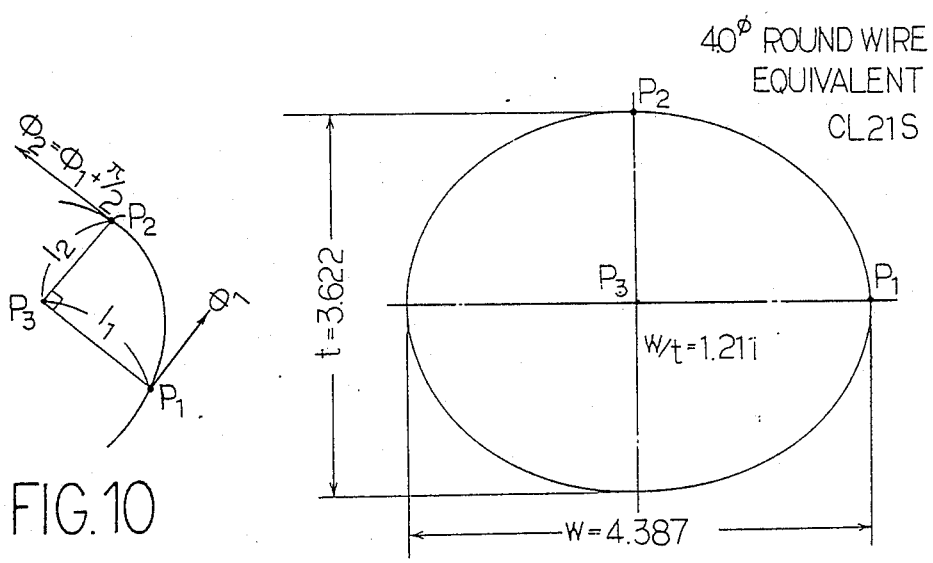
FIG. 10
FIG. 11

COIL SPRING

BACKGROUND OF THE INVENTION

The present invention relates to improvements in a coil spring and particularly to improvements in the construction of the cross-sectional shape of a strand which forms such spring.

A coil spring is usually formed of a strand of circular cross-section, presenting a problem that when it is subjected to axial loads, a maximum stress is produced at a point on the inner peripheral side of the coil, resulting in cracks being formed thereat which lead to breakage.

To solve said problem, there has been proposed a system (hereinafter referred to as a multi-arc system) in which the strand is formed to have a substantially oval cross-sectional shape defined by putting together a plurality of arcs of different radii of curvature.

In said multi-arc system, the radii of curvature of arcs on the various portions of the cross-sectional circumference are changed in such a manner as to lower the maximum stress in consideration of the distribution of stresses in the circular cross section; thus, there are observed improvements over products which use strands of circular cross section.

However, in said multi-arc system, since the radii of curvature of arcs which define the various portions of the cross-sectional circumference of the strand differ stepwise from each other, the distribution of surface stresses is discontinuous at the boundaries of adjacent arcs, tending to produce cracks due to stress concentration.

Generally, the service life of springs is determined by the maximum stress on the cross-sectional circumference of the strand, and in this connection said multi-arc system is still insufficient in lowering the maximum stress on the cross-sectional circumference of the strand.

SUMMARY OF THE INVENTION

The present invention has been proposed in view of the above-mentioned problems in the prior art and has for its object the provision of a coil spring having a cross-sectional shape which ensures that the distribution of surface stresses on the cross sectional circumference of the strand is smoothly continuous and that the maximum stress is further reduced.

To achieve the above object, according to the present invention a coil spring is formed of a strand having a width w and a thickness t, related to each other such that $1.1 \leq c \leq 1.7$ where $c = w/t$, said strand having a cross-sectional shape defined by a plurality of partial curves which are portions of a clothoid, said partial curves being put together to form a closed loop.

Further, according to the invention, tangents drawn at the boundaries of partial curves put together coincide in direction with each other.

(Functions)

In a clothoid, the radius of curvature changes continuously in inverse proportion to the length of the curve; therefore, by putting together a plurality of partial curves which are portions of the clothoid, it is possible to form a strand having a cross-sectional shape in the form of a smoothly continuous closed loop.

When said partial curves are put together, the joint at each boundary between two adjacent partial curves can be made smooth without any unevenness if the tangents to any adjacent two of said partial curves at their boundary where they are put together coincide in direction with each other.

Therefore, it becomes possible to make the distribution of surface stresses continuous and to lower the maximum stress.

According to the invention, the distribution of surfaces stresses on the cross-sectional circumference of a strand can be made smoothly continuous, further reducing the maximum stress in the coil spring. As a result, the fatigue limit is improved and a longer service life is realized. Further, when a coil spring which produces the same stress, the cross-sectional area of the strand can be reduced by an amount corresponding to the reduction in the maximum stress and hence the diameter of the strand can be reduced while reducing the compressed strength of the coil spring.

BRIEF DESCRIPTION OF THE DRAWINGS

FIG. 8 is a cross-sectional view of a completed strand according to said method;

FIG. 10 is a view for explaining another method for constructing the cross-sectional shape of a strand from a clothoid;

FIG. 11 is a cross-sectional view of a completed strand as described in FIG. 10;

DETAILED DESCRIPTION OF THE PREFERRED EMBODIMENT

Figure 1:
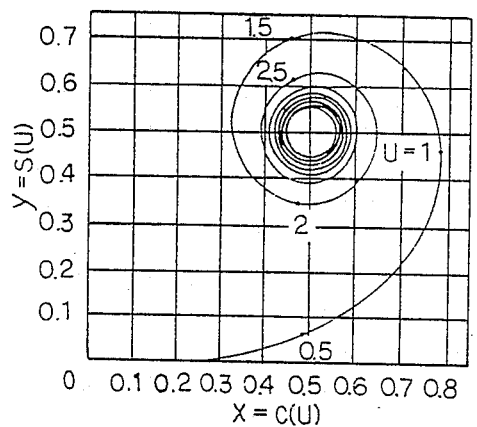
FIG. 1 is an explanatory view of a clothoid employed in the present invention.

FIG. 1 is an explanatory view of a clothoid employed in the present invention. This clothoid is known as its radius of curvature changing continuously in inverse proportion to the length of the curve.

The equation of a clothoid is expressed, using the length u of the curve as a parameter, as follows:

$$x = a \cdot c(u) = a \int_0^u \cos\frac{\pi u^2}{2} du \quad \quad (1)$$
$$y = a \cdot s(u) = a \int_0^u \sin\frac{\pi u^2}{2} du$$

where a is a proportionality constant.

$$\phi = \frac{\pi u^2}{2} \quad \quad (2)$$

The radius of curvature, $\rho$, is:

$$\rho = \pm \frac{a}{\pi u} \quad (3)$$

These functions x and y cannot be dealt with in elementary functions; however, $\phi$ and $\rho$ are functions of the length u of the curve and have simple forms, as indicated by equations (2) and (3), so that they are easy to deal with.

Figure 2:
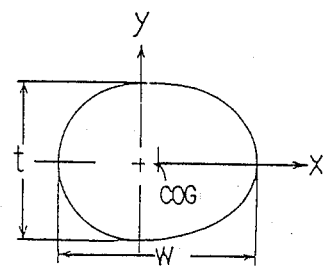
FIG. 2 is a sectional view showing an example of a strand having an oval cross section.

On the other hand, an example of a strand having an oval cross section is shown in FIG. 2.

This example is constructed by connecting an ellipse and a circle, wherein w indicates the width of the strand, t the thickness and COG the center of gravity. The present invention is intended to determine the cross sectional shape of the oval cross sectional strand by using a clothoid.

An example of a method therefor will now be described.

In FIG. 2, since the curve is symmetrical with respect to the x-axis, it is only necessary to construct the curve with respect to the first and second quadrants (I) and (II) in the upper half of the curve.

However, it is necessary to determine the curve so that the directions of tangents to the curve are $\pi/2$ and $-\pi/2$.

Next, c=w/t (width/thickness ratio) is given in advance.

And the construction of the upper half of the curve above the x-axis in FIG. 2 will now be considered by using a curve which is a portion of the clothoid.

Figure 3:
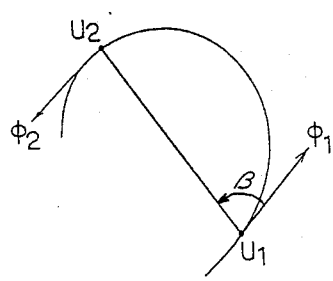
FIGS. 3 through 7 are explanatory views showing an example of a method for constructing the upper half of the cross-sectional shape of the strand shown in FIG. 2 from a clothoid.

First, as shown in FIG. 3, a portion of the clothoid is taken out and u1 is given to calculate u1→x1, y1, $\phi$1 by equations (1) and (2). And by setting $\phi 2=\phi 1+\pi$, u2 is calculated from equation (2) and u2→x2, y2 is found by equation (1).

At this time, in order to construct the upper half of the curve above the x-axis in FIG. 2 by using a portion of the clothoid, it is at least necessary that in FIG. 3 the angle $\beta$ between the line u1 u2 and the tangent $\phi$1 to the u1 be $\beta=\pi/2$; however, the presence of such u1 and u2 cannot be confirmed.

Thus, the case of cutting off two partial curves from the clothoid and connecting them together to construct the curve in the upper half above the x-axis in FIG. 2 will now be considered.

Figure 4:
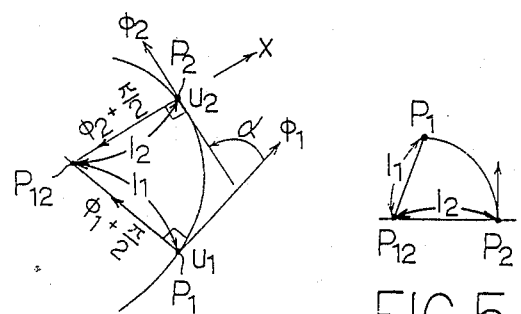

In this case, as shown in FIG. 4, the included angle $\alpha$ between $\phi$1 and $\phi$2 is given. When $\alpha<\pi/2$, first, u1 is determined and u1→x1, y1, $\phi$1 is found from equations (1) and (2). By setting $\phi 2=\phi 1+\alpha$, u2 is found from equation (2) and u2→x2, y2 is found from the u2 by using equation (1).

Let the coordinates of the positions of said u1 and u2 be P1 and P2 and the coordinates of the position of the intersection of straight lines orthogonal to the tangents $\phi$1 and $\phi$2 at the two points be P12. The respective lengths of the line segments $\overline{P1\,P12}=l1$ and $\overline{P2\,P12}=l2$ will then be calculated.

Figure 5:
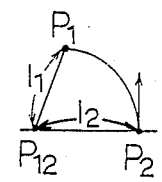

This curve is inverted around the line segment $\overline{P2\,P12}$ serving as an axis and is moved until the u2 coincides with the x-axis (see FIG. 5).

Figure 6:
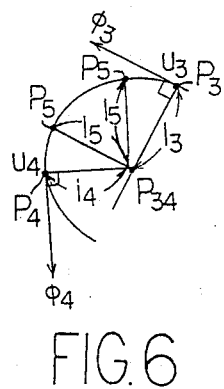

Then, as shown in FIG. 6, by taking out a portion of the clothoid and suitably determining the u3, u3→x3, y3, $\phi$3 is found from equations (1) and (2).

And $\phi$4 is found such that $\phi 4=\phi 3+\pi-\alpha$, and u4 is found by equation (2) and x4 and y4 are found from this u4 by (1).

Let the coordinates of the positions of said u3 and u4 be P3 and P4 and the coordinates of the position of the intersection between straight lines orthogonal to the tangents $\phi$3 and $\phi$4 at the two points be P34.

Now, either the line segment $\overline{P34\,P4}$ or the line segment $\overline{P3\,P34}$ is moved until it coincides with the x-axis. The result will be the same irrespective of which line segment is moved; herein will be described a case in which the line segment $\overline{P34\,P4}$ is brought into coincidence with the x-axis.

Figure 7:
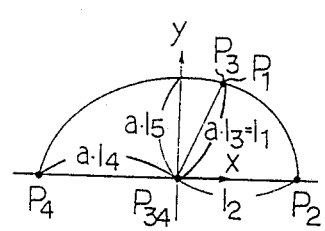

In FIG. 7, the curves u3 and u4 of FIG. 6 are cut off and brought into coincidence with the x-axis. Let the length of the line segment $\overline{P3\,P34}$ be a·13, and let it be equal to l1 in FIG. 5 (a·13=l1). The length of the line segment $\overline{P4\,P34}$ is expressed as a·14. And u5, x5 and y5 which provide $\phi 4-\pi/2=\phi 5$ are found from equations (2) and (1). Let the coordinates of the position of u5 be P5 and the length of the line segment P34 P5 be a·15, and u3 is calculated such that (a·14+l1)-/2a15=w/t=c. (f=l2−a·13=0).

Sometimes, there will be no solution thereto, but the u3 which results from gradually increasing the u1 can be found.

Let the range in which the solution to u1 exists be such that u1s≦u1≦u1e. Then, it becomes possible to perform a computer simulation with respect to the respective shapes by the finite element method or boundary element method to ensure that the distribution of surface stresses is optimum.

Figure 9:
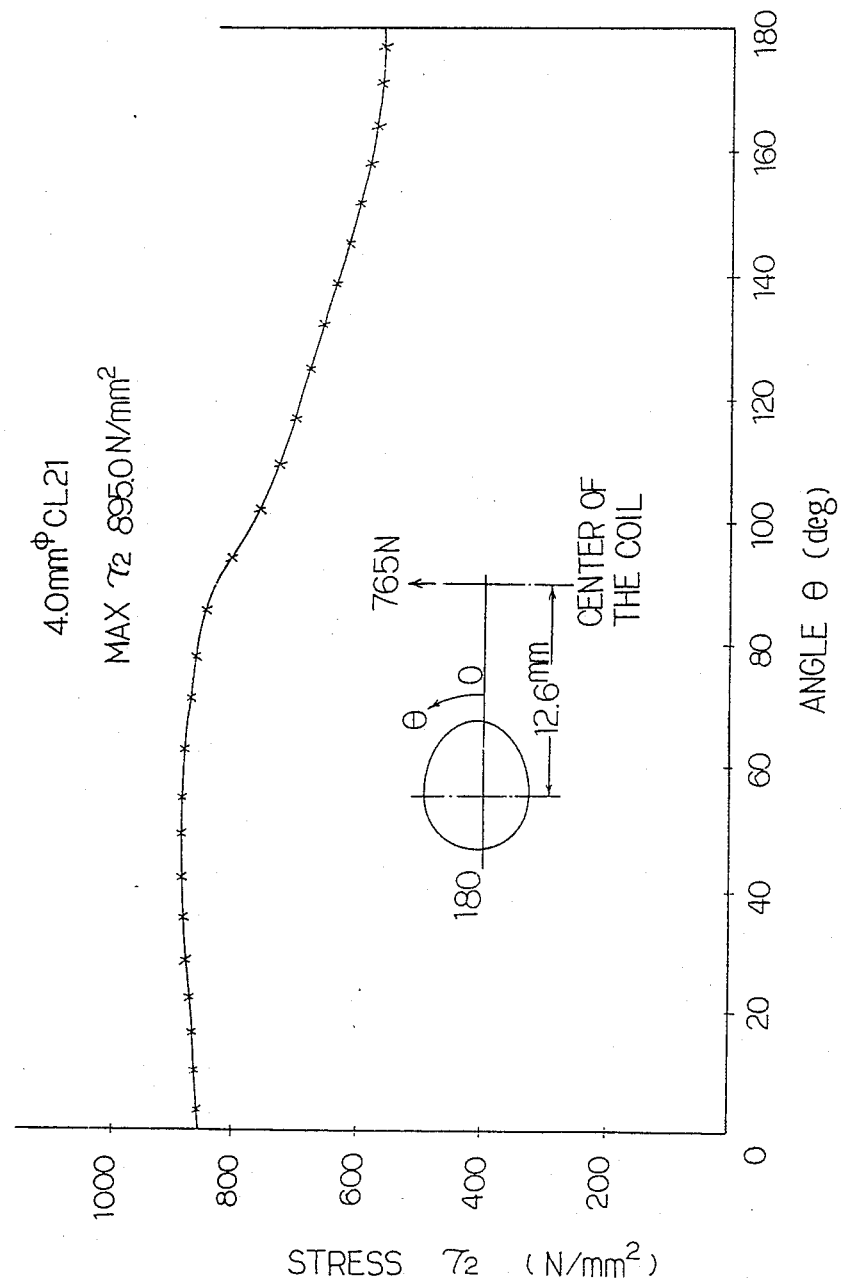
FIG. 9 is a graph showing the distribution of stresses in the strand of FIG. 8.

FIG. 8 shows an example of a solution, though not optimum, in which w/t=1.21 and $\phi=\pi/2$, and FIG. 9 shows the stress distribution thereof.

When the curves shown in FIGS. 5 and 7, respectively, are put together, the upper half curve above the x-axis shown in FIG. 2 is obtained and when this curve is combined with a second curve which is obtained by inverting the first curve, a curve CL21 in the form of a closed loop shown in FIG. 8 is obtained. The joins in said curve CL21 coincide on the x-axis and somewhat deviate in other regions.

Next, as shown in FIG. 10, a =w/t is determined and P1 and P2 which ensure that l1/l2 in FIG. 10 is equal to a and that $\phi$2 is $\phi 2=\phi 1+\pi/2$, are found from equations (1) and (2) in the same manner as described above.

And this is used as a curve for the first quadrant and mirror-symmetrically extended to the second, third and fourth quadrants, and these four curves are put together, thereby providing a curve CL21S in the form of a closed loop which is symmetrical with respect to the x-and y-axes, as shown in FIG. 11. In the case of this curve CL21S, the tangents at the respective joints coincide in direction with each other.

The distribution of stresses on the sectional circumference of a coil spring formed of a strand whose cross-sectional circumference has the curve CL21S thus constructed is improved as compared with a spring of elliptic cross-section having the same area; with such improved coil spring for use with valves, it has been found that good results are obtained with the maximum stress for D/d (coil diameter/strand diameter)=6 or thereabouts being lowered.

Figure 12:
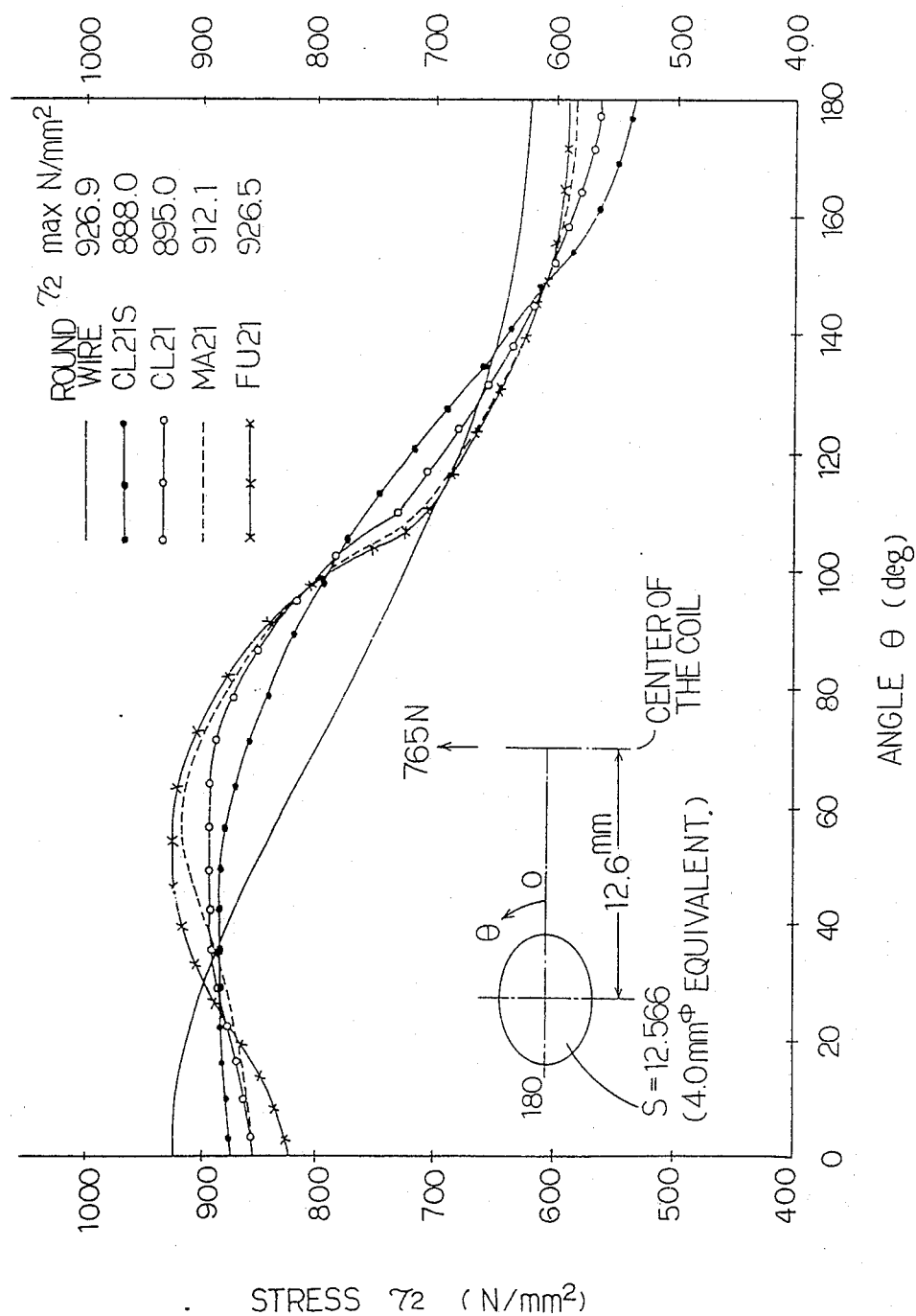
FIG. 12 is a graph showing a comparison of stress distributions between conventional strands and inventive strands.

FIG. 12 is a graph showing the stress distributions of strands having the curves CL21 and CL21S according to the present invention in their respective cross sections, a strand having a multi-arc curve MA21, and a round wire, the cross-sectional area corresponding to that of a strand of 4.0 mm in diameter, the coil radius being 12.6 mm, the axial load being 765 N, the $\theta$ being measured over 180 degrees extending from the inner peripheral surface to the outer peripheral surface.

In the round wire, the maximum stress is 926 N/mm$^2$ at $\theta = 0°$.

In the multi-arc curve CL21, the maximum stress is 912.1 N/mm$^2$ at $\theta = 60$ degrees or thereabouts.

In the present invention, the maximum stress is 895.0 N/$^2$ for the curve CL21 and 888.0 N/mm$^2$ for the curve CL21S, both values being lower than the conventional values; particularly, the region where the maximum stress occurs extends from $\theta = 0°$ to $\theta = 80°$, covering a wide range where it is distributed substantially at the same level; thus, the invention is characterized in that stress concentration will hardly occur.

Figure 13:
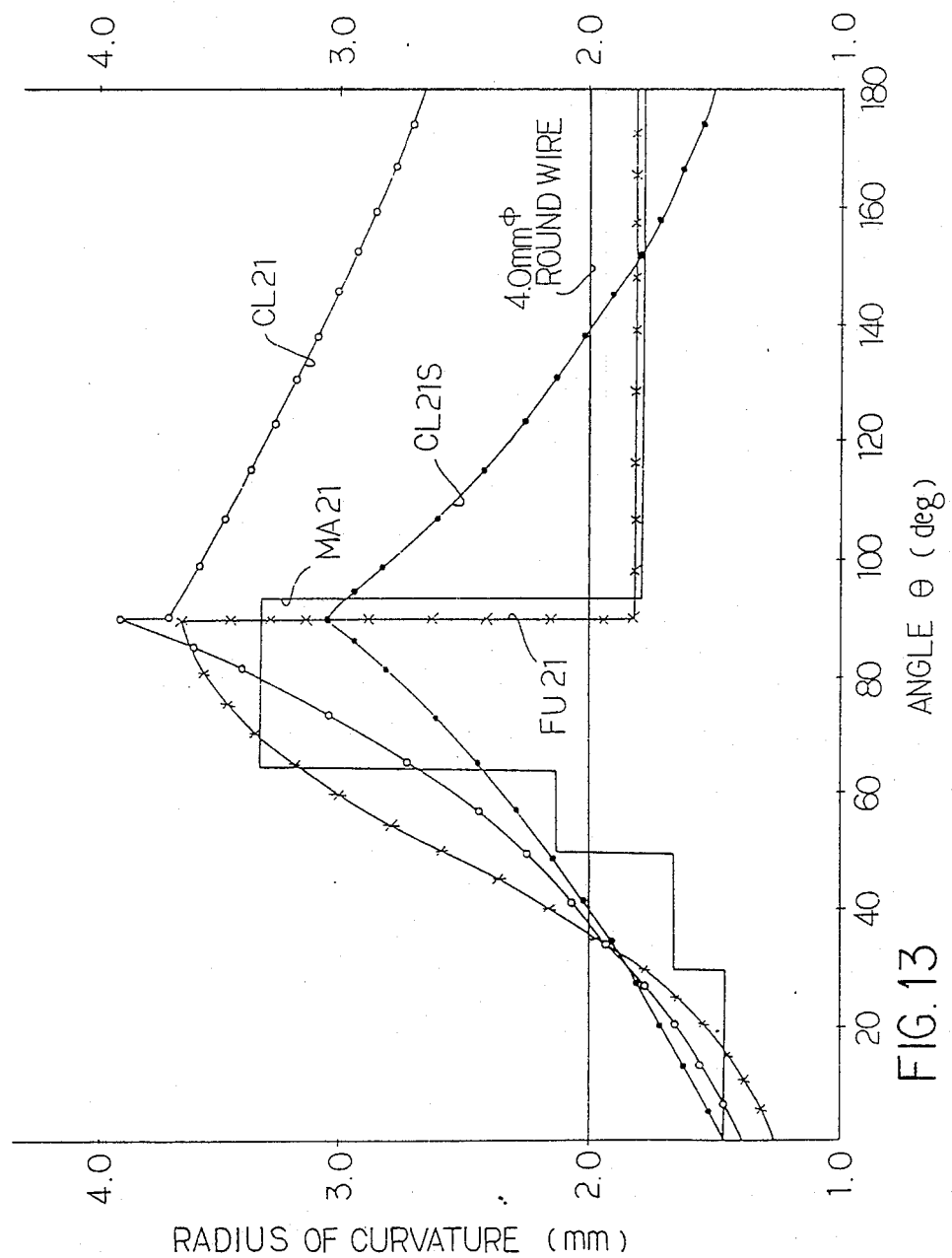
FIG. 13 is a graph showing the distribution of radii of curvature in that case.

FIG. 13 is a graph showing the distribution of the respective radii of curvature of the curves shown in FIG. 12, and the way $\theta$ is expressed is the same as in FIG. 12. In FIG. 13, the curve FU21 is a combination of a semi-circle and a semi-ellipse; the curve CL21S continuously changes in the radius of curvature; and in the case of the curve CL21, though there is discontinuity, the amount thereof is smaller than in the case of the curve FU21 which is a combination of a semi-circle and a semi-ellipse.

Further, in the present invention, the ratio w/t of the width w of the strand to its thickness t is restricted to $1.1 \leq c \leq 1.7$ for the following reason.

As for the lower limit, if it is less than 1.1, though the distribution of stresses is somewhat flat as compared with that of the round wire, there is no merit worthy of adoption, and a strand of 3.93 mm in diameter will produce a stress which corresponds to that for the round wire of 4.0 mm in diameter but there is only a merit of 0.25 mm in terms of pitch clearance for each convolution of the spring; with any other value below that, the situation will be the same as when the round wire is used.

In the present invention, a non-symmetrical curve CL21 and a symmetrical curve CL21S have been exemplified; however, the method of utilizing a clothoid in connection with each curve may be used in a manner in which such curve is more finely divided.

(Advantages of the Invention)

We claim:

1. A coil spring, comprising:
   a strand having a width w and a thickness t, such that $1.1 \leq c \leq 1.7$, where c is a ratio determined according to $c = w/t$,
   wherein said strand has a cross-sectional shape defined by a plurality of partial curves, which are portions of a clothoid, as a curve whose radius varies inversely in proportion to its length, and
   wherein said partial curves are combined to form a closed loop.

2. The coil spring of claim 1, wherein tangent lines of any adjacent two of said partial curves, at their boundaries where they are combined, are oriented in the same direction.

* * * * *